R. B. DISBROW.
MILKING APPARATUS.
APPLICATION FILED JUNE 13, 1917.
1,304,280.
Patented May 20, 1919.
2 SHEETS—SHEET 2.
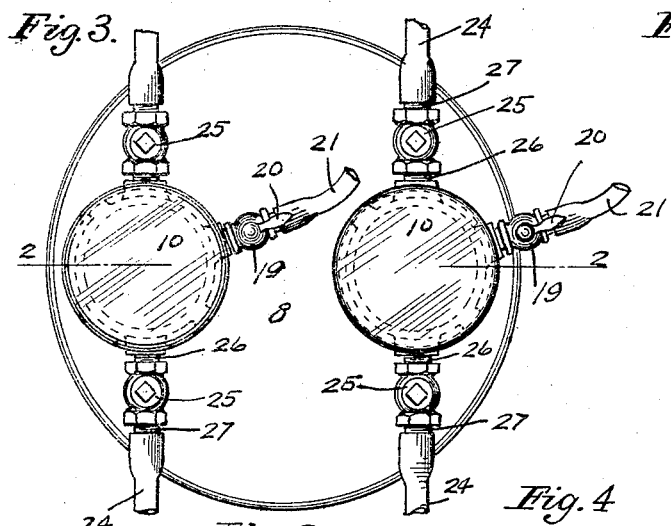
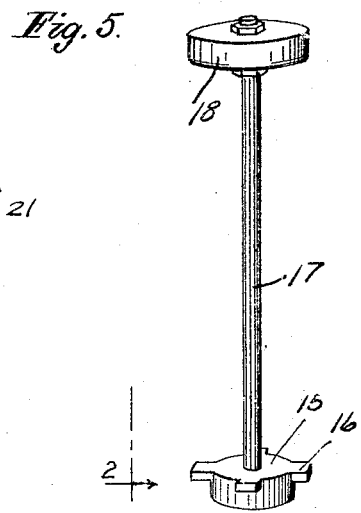
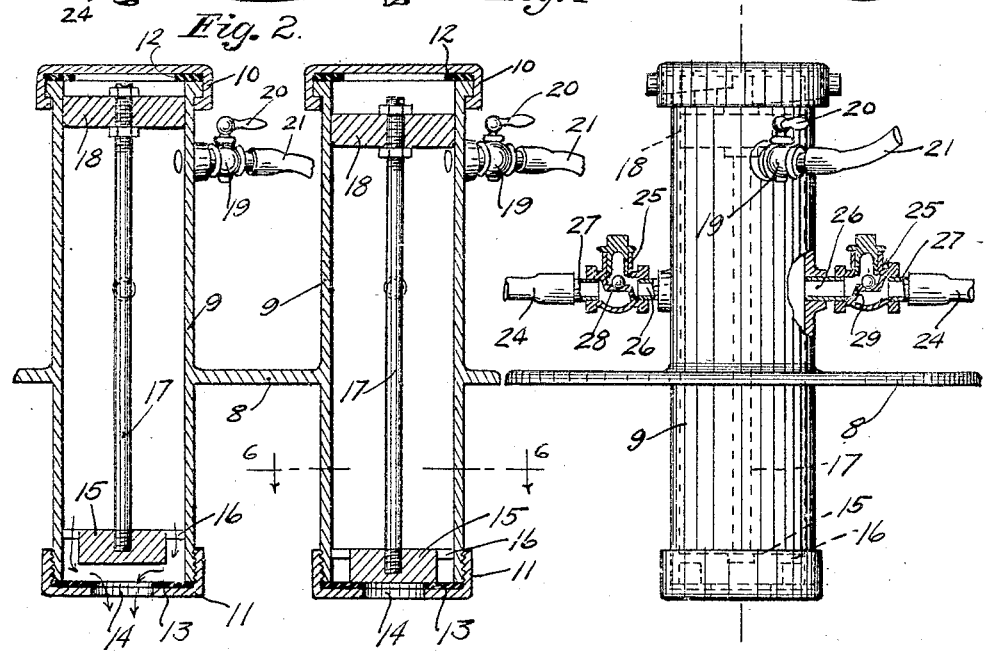
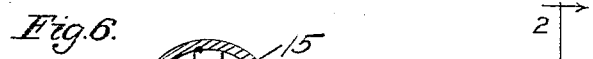
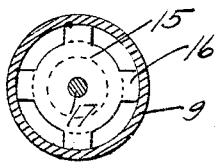
Inventor
REUBEN B. DISBROW
By his Attorneys

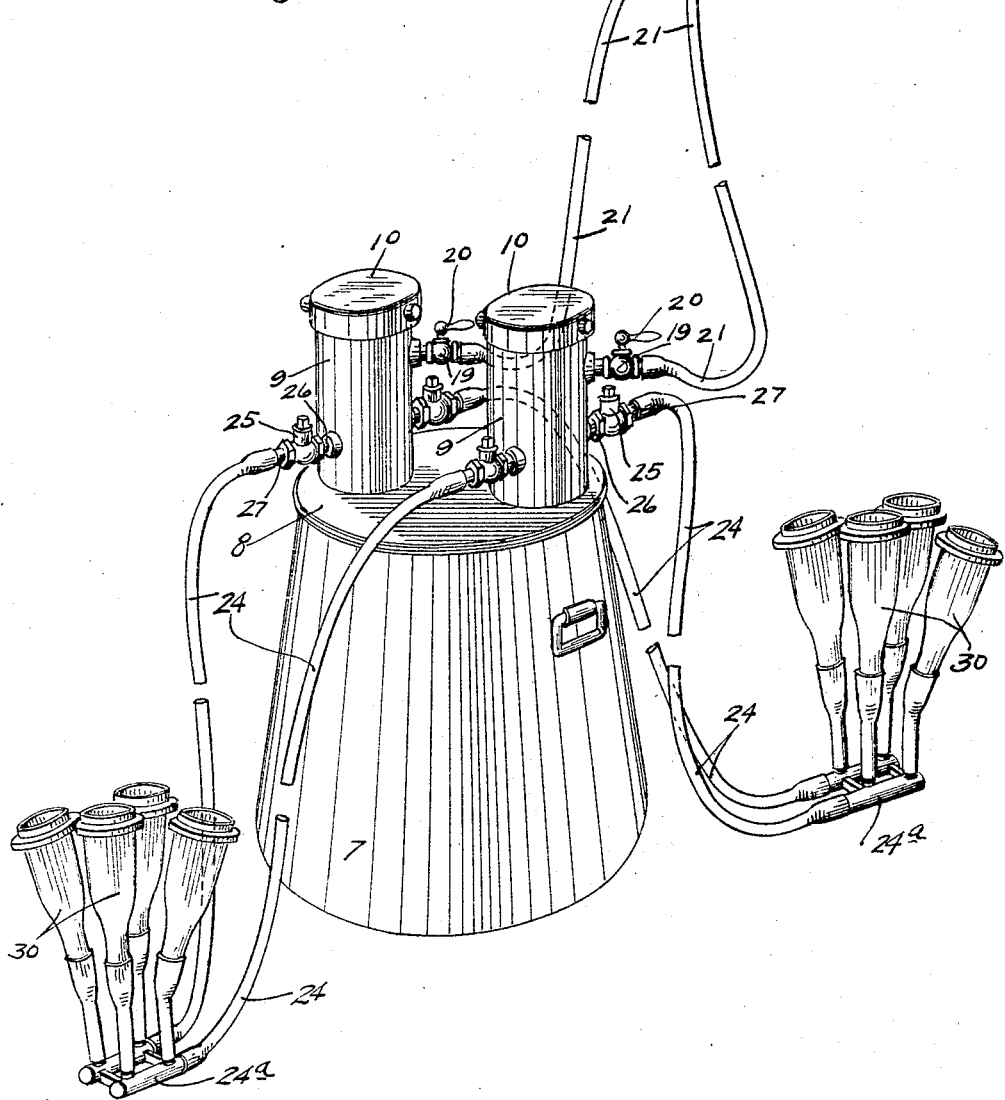

UNITED STATES PATENT OFFICE.

REUBEN B. DISBROW, OF ST. PAUL, MINNESOTA.

MILKING APPARATUS.

1,304,280.     Specification of Letters Patent.     Patented May 20, 1919.

Application filed June 13, 1917. Serial No. 174,500.

*To all whom it may concern:*

Be it known that I, REUBEN B. DISBROW, a citizen of the United States, residing at St. Paul, in the county of Ramsey and State of Minnesota, have invented certain new and useful Improvements in Milking Apparatus; and I do hereby declare the following to be a full, clear, and exact description of the invention, such as will enable others skilled in the art to which it appertains to make and use the same.

My present invention has for its object to provide a milking apparatus of simplified and improved construction and, to such ends, generally stated, the invention consists of the novel devices and combinations of devices hereinafter described and defined in the claims.

In the accompanying drawings, which illustrate the invention, like characters indicate like parts throughout the several views.

Referring to the drawings:

Figure 1 is a perspective view of the milking apparatus;

Fig. 2 is a vertical section taken on the line 2—2 of Figs. 3 and 4;

Fig. 3 is a plan view of the milk can cover and the parts mounted directly thereon;

Fig. 4 is a side elevation of the parts shown in Fig. 3, some parts being sectioned;

Fig. 5 is a perspective view of the milk delivery valve and its actuating piston; and Fig. 6 is a horizontal section on the line 6—6 of Fig. 2.

In this preferred form of the apparatus, the milk chambers which are in the form of cylinders are directly applied to the milk can cover with approximately one-half thereof depending below the cover and projecting into the can, and approximately the other half portion thereof projecting above the cover. The milk delivery ports from the milk chambers into the milk can are thus located inside of the can, and materially below the cover.

Working within the cylindrical milk chambers and arranged to open and close the milk delivery ports thereof, are so-called milk delivery valves, each of which has its own actuator located within the coöperating milk chamber and subject to the suction pulsations that are produced within the respective milk chambers. These valve actuators are preferably pistons, but might be diaphragms. The milk tubes and the vacuum or pulsation producing tubes are connected to the respective cylindrical milk chambers at points between the milk delivery valves and their coöperating actuators; and in each cylinder or chamber, above the valve actuator or piston, is a closed air chamber or space that performs an important function to be hereinafter noted.

This preferred form of the said apparatus described in detail is as follows:

The milk pail or receptacle 7 has a detachable cover 8 which need not fit the same tightly, but may rest loosely thereon. This cover affords a base for the upright cylindrical milk chambers 9 and, in fact, said parts 8 and 9 may be integrally cast. These cylinders 9, as noted, project about one-half below the cover, and hence into the pail or receptacle 7.

Caps 10 and 11 are detachably applied respectively to the upper and lower ends of the cylinders 9. The said caps 10 completely close the upper ends of the cylinders and, as shown, are detachably held to the said cylinders by cam actuating bayonet joints of well known construction. The caps 11, as shown, have threaded engagement with the cylinders. Gaskets 12 are shown as interposed in the joints between the caps 10 and cylinders 9, while gaskets 13 are interposed between the caps 11 and lower ends of said cylinders. Said caps 11 and gaskets 13 have large alined perforations 14 that afford the milk discharge ports from the cylinders or milk chambers into the milk pail.

For closing the ports 14, so-called milk delivery valves 15 are arranged to seat directly on the gaskets 13. These valves 15 are provided with radially projecting circumferentially spaced lugs 16 that engage the interiors of the cylinders 9 and hold said valves 15 for true axial movements within said cylinders. The said two valves 15 are independently movable and each is secured to the lower end of an axial stem 17, the upper end of which is secured to the valve actuator, shown in the form of a piston 18, working with close engagement within the coöperating cylinder.

At points some little distance below their extreme upper ends, the cylinders 9 are provided with nipples 19 preferably equipped with normally open valves 20. Flexible pulsator tubes 21 are attached to these nipples 19 and are connected to the opposite piston chambers of a double ended pump cylinder 22 in which pistons 23 are arranged to work.

The rods of the pistons 23 in practice will be connected for simultaneous reciprocating movements, so that they will produce in the two cylinders 22, and hence, in the two cylinders or milk chambers 9, suction or partial vacuum in reverse or alternate order.

Milk tubes are connected to each cylinder or milk chamber 9, and as shown, each such milk tube comprises a flexible hose 24, a valve casing 25, and short metal tubes 26 and 27. The tubes 26 connect the valve casings to the respective cylinders 9 at points intermediate of their upper and lower ends, and preferably, at points above the cover. The valve casings 25 have partitions formed with passages normally closed by check balls 28. These check balls 28 are adapted to be raised by suction or partial vacuum produced in the cylindrical milk chambers 9. The partitions 25 are formed with small air leakage passages 29. The feature of novelty in the arrangement of the check valves in the milk tubes is not, however, herein claimed, *per se*, but is disclosed and claimed in my prior application, S. N. 169,914, filed May 21, 1917.

The teat cups of which there are preferably two groups of four each, are indicated as entireties by the numeral 30. Of each group of four teat cups, two are connected to one of the milk tubes from one of the chambers 9, and the other two are connected to one of the tubes from the other of the said chambers 9. As shown, the said milk tubes 24, at their free ends, are provided with tubular metallic ends 24ᵃ that are tied together in pairs and to which the teat cups are directly connected in the manner above stated.

*Operation.*

Under simultaneous reciprocations of the two pump pistons 23, partial vacuum and air compression will be produced in the cylindrical milk chambers 9 alternately and in reverse order in the said chambers. As more fully described in my said prior application, partial vacuum in one of the milk chambers 9 operating through the check valve described, will produce quick partial vacuum or suction in the teat cups, and air compression in the said milk chamber will produce a retarded or slow release of the partial vacuum or suction in the said teat cups.
Of course, gravity tends to keep the milk delivery valves 15 normally seated and the milk delivery ports 14 closed. However, when partial vacuum is produced in one of the milk chambers 9, the seating of the valve 15 is further insured by the preponderance of air pressure on the piston 18 over that produced on the said valve 15 through the coöperating port 14. The pistons 18, it will be noted, are always above nipples 19 of the pulsator tubes 21 so that said pulsator tubes are properly connected to produce in the cylindrical milk chambers 9 below said pistons, the above described pressure pulsations. When partial vacuum is produced in a milk chamber 9, and its valve 15 is tightly closed, as stated, the milk will be drawn from the teat cups into the said chamber and will probably about half fill the same.

When the partial vacuum is relieved and air pressure is then produced in the said milk chamber, the preponderance of force on the under surface of the coöperating piston 18 will raise the said piston and the connected milk distributing valve approximately as shown at the left in Fig. 2 and, moreover, this air pressure when said valve is moved to open position will instantly discharge with a blowing action, the milk from the said milk chamber downward and outward through the port 14 and into the milk can. The manner of delivery is not only instantaneous and positive, but the milk is discharged into the can at a point below the cover and within the can.

In practice I have found that when a delivery valve 15 is raised, as above described, its piston 18 will be forced against air confined in the upper end of the cylinder 9, thereby compressing somewhat the air confined in said cylinder above said piston, and that this confined air as soon as the milk is discharged into the can from the lower end of the milk chamber, will quickly force the said piston downward and thereby insure quick closing of the delivery valve. The air confined in the upper end of the milk chamber or cylinder 9 and operating as above described, acts in advance of the partial vacuum or suction to at least start the closing movement of the delivery valve 15.

In the above described action, it is important to note that while the two delivery valves 15 and their connected pistons are given alternated movements, nevertheless, that they are not positively connected for synchronous movements, but are independently movable so that each is independently free to respond to the positive and negative pressure of the air pulsations produced in the respective milk chambers.

What I claim is:

1. In a milking apparatus, the combination with a milk chamber having a milk delivery port, of a valve for opening and closing said port, a valve actuator connected to said valve and subject to varying suction pressure in said milk chamber, a milk tube opening into the intermediate portion of said milk chamber, and means for producing suction pulsations in said milk chamber, including a port connected to said chamber at a point that is always between said milk delivery port and said valve actuator.

2. In a milking apparatus, the combination with an upright milk chamber having a milk delivery port in its lower portion, of a valve working within said chamber and serving to open and close said port, a valve actuator movably mounted in the upper portion of said milk chamber and connected to said valve, a milk tube opening into the intermediate portion of said milk chamber, and means for producing suction pulsations in said chamber including a port opening through the wall of said chamber at a point always between said milk delivery port and said valve actuator.

3. In a milking apparatus, the combination with milk chambers having milk inlet and delivery ports, of means for producing suction pulsations in said milk chambers, independently movable valves for closing and opening said delivery ports, and valve actuators connected to said valves and movable in said milk chambers under varying pressure therein, said milk chambers above said actuators having closed air chambers.

4. In a milking apparatus, the combination with upright cylindrical milk chambers having intermediate milk intake ports and lower end milk delivery ports, of means for producing suction pulsations in said milk chambers, valves for closing and opening said milk delivery ports, pistons working in the upper ends of said cylindrical milk chambers and having stems connecting them to the respective delivery valves, the said cylinders having closed air chambers above said pistons.

5. In a milking apparatus, the combination with upright cylindrical milk chambers having intermediate milk intake ports and lower end milk delivery ports, of means for producing suction pulsations in said milk chambers, valves for closing and opening said milk delivery ports, pistons working in the upper ends of said cylindrical milk chambers and having stems connecting them to the respective delivery valves, the said cylinders having closed air chambers above said pistons, and a can cover, the said cylindrical milk chambers being rigidly secured to and projected both above and below said cover.

6. In a milking apparatus, the combination with milk chambers having milk inlet and delivery ports, of means for producing suction pulsations in said milk chambers, independently movable valves for closing and opening said delivery ports, valve actuators connected to said valves and movable in said milk chambers under varying pressure therein, teat cups having milk tubes connected to the intake ports of said milk chambers, and means for giving clear communication between said milk tube and milk chamber, under partial vacuum in the latter and for giving restricted communication between said milk tube and milk chamber under decreasing vacuum or increasing pressure therein.

7. In a milking apparatus, the combination with upright cylindrical milk chambers having milk delivery ports in their lower portions, of valves working in the respective milk chambers and operative to independently open and close said delivery ports, valve actuating pistons working in the upper portions of said cylinders and connected to the respective valves, milk tubes opening into the intermediate portions of said milk chambers, and means for producing suction pulsations in said milk chambers including ports opening through the walls of the respective chambers at points that are always between said milk delivery ports and the respective pistons.

8. In a milking apparatus, the combination with a milk chamber having a milk delivery port, a valve for opening and closing said port, of a valve actuator connected to said valve and subject to varying suction pressure in said milk chamber, a milk tube opening into the intermediate portion of said milk chamber, and means for producing suction pulsations in said milk chamber, including a port connected to said chamber at a point that is always between said milk delivery port and said valve actuator, the area of said milk delivery port being materially less than that portion of said valve actuator that is exposed to the suction pulsations.

9. In a milking apparatus, the combination with upright cylindrical milk chambers having milk delivery ports in their lower portions, of valves working in the respective milk chambers and operative to independently open and close said delivery ports, valve actuating pistons working in the upper portions of said cylinders and connected to the respective valves, milk tubes opening into the intermediate portions of said milk chambers, and means for producing suction pulsations in said milk chambers including ports opening through the walls of the respective chambers at points that are always between said milk delivery ports and the respective pistons, the area of said milk delivery port being materially less than the area of said valve actuating piston.

In testimony whereof I affix my signature in presence of two witnesses.

REUBEN B. DISBROW.

Witnesses:
BERNICE G. WHEELER,
HARRY D. KILGORE.